(12) United States Patent
Iwase et al.

(10) Patent No.: US 9,670,838 B2
(45) Date of Patent: Jun. 6, 2017

(54) VEHICLE DRIVE DEVICE

(71) Applicants: Mikio Iwase, Anjo (JP); Daiki Suyama, Okazaki (JP); Naoya Jinnai, Anjo (JP); Kensuke Wada, Anjo (JP); Yuji Inoue, Nissin (JP); Yukihiko Ideshio, Nissin (JP)

(72) Inventors: Mikio Iwase, Anjo (JP); Daiki Suyama, Okazaki (JP); Naoya Jinnai, Anjo (JP); Kensuke Wada, Anjo (JP); Yuji Inoue, Nissin (JP); Yukihiko Ideshio, Nissin (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 232 days.

(21) Appl. No.: 14/317,852

(22) Filed: Jun. 27, 2014

(65) Prior Publication Data

US 2014/0305721 A1 Oct. 16, 2014

Related U.S. Application Data

(63) Continuation of application No. 13/659,361, filed on Oct. 24, 2012, now Pat. No. 9,261,017.

(Continued)

(30) Foreign Application Priority Data

Nov. 4, 2011 (JP) .................................. 2011-242916

(51) Int. Cl.
*F16D 33/00* (2006.01)
*F02B 63/04* (2006.01)
(Continued)

(52) U.S. Cl.
CPC ........... *F02B 63/042* (2013.01); *B60W 20/30* (2013.01); *F16D 33/02* (2013.01); *F16D 48/02* (2013.01);
(Continued)

(58) Field of Classification Search
CPC ........ F16D 25/06; F16D 25/063; F16D 33/00; B60W 20/00; B60W 20/10; B60W 20/30
See application file for complete search history.

(56) References Cited

U.S. PATENT DOCUMENTS 6,478,101 B1 11/2002 Taniguchi et al.
8,622,182 B2 1/2014 Iwase et al.
(Continued)

FOREIGN PATENT DOCUMENTS

JP  A-2006-137406  6/2006
JP  A-2006-168443  6/2006
(Continued)

OTHER PUBLICATIONS

Nov. 13, 2012 International Search Report issued in International Application No. PCT/JP2012/076335 (with translation).
(Continued)

*Primary Examiner* — Thomas E Lazo
*Assistant Examiner* — Daniel Collins
(74) *Attorney, Agent, or Firm* — Oliff PLC

(57) ABSTRACT

A vehicle drive includes a speed change mechanism connected to a rotary electric machine; an output member connected to the speed change mechanism and wheels; an engagement device changes a state of engagement between an input member connected to an engine and the speed change mechanism; a hydraulic pump driven by the engine or the rotary electric machine; a first pressure control device that controls pressure supplied from the pump and supplies the pressure to the speed change mechanism; a second, (Continued)

separate hydraulic pressure control device that controls the pressure supplied from the pump and supplies the pressure to the engagement device; and a case that houses the rotary electric machine, speed change mechanism, engagement device, and pump. At least the engagement device is housed in a space formed by the case, and the second hydraulic pressure control device is provided at a part of the case forming the space.

3 Claims, 6 Drawing Sheets

Related U.S. Application Data

(60) Provisional application No. 61/592,225, filed on Jan. 30, 2012.

(51) Int. Cl.
*F16D 33/02* (2006.01)
*B60W 20/30* (2016.01)
*F16D 48/06* (2006.01)
*F16D 48/02* (2006.01)
*F16D 25/0638* (2006.01)

(52) U.S. Cl.
CPC ........ *F16D 48/062* (2013.01); *F16D 25/0638* (2013.01); *F16D 2048/0209* (2013.01); *F16D 2048/0287* (2013.01); *F16D 2300/26* (2013.01)

(56) References Cited

U.S. PATENT DOCUMENTS

| | | |
|---|---|---|
| 8,758,180 B2 | 6/2014 | Frait et al. |
| 8,836,181 B2 | 9/2014 | Iwase et al. |
| 8,845,484 B2 | 9/2014 | Kamiya et al. |
| 9,140,311 B2 | 9/2015 | Iwase et al. |
| 2010/0105518 A1 | 4/2010 | Kasuya et al. |
| 2011/0240431 A1 | 10/2011 | Iwase et al. |
| 2013/0284009 A1 | 10/2013 | Mitsui et al. |
| 2014/0162839 A1 | 6/2014 | Miyazaki et al. |

FOREIGN PATENT DOCUMENTS

| | | |
|---|---|---|
| JP | A-2007-261302 | 10/2007 |
| JP | A-2008-239125 | 10/2008 |
| JP | A-2010-196867 | 9/2010 |
| JP | A-2011-105192 | 6/2011 |
| JP | A-2011-131828 | 7/2011 |

OTHER PUBLICATIONS

Jun. 18, 2015 Office Action issued in U.S. Appl. No. 13/659,361.
Feb. 28, 2017 Office Action Issued in U.S. Appl. No. 14/317,991.

VEHICLE DRIVE DEVICE

INCORPORATION BY REFERENCE

This is a Continuation of application Ser. No. 13/659,361 filed Oct. 24, 2012, which claims the benefit of U.S. Provisional Application No. 61/592,225 filed Jan. 30, 2012, which in turn claims the benefit of Japanese Patent Application No. 2011-242916 filed on Nov. 4, 2011. The disclosure of the prior applications is hereby incorporated by reference herein in its entirety.

BACKGROUND OF THE INVENTION

The present invention relates to a vehicle drive device provided with an input member drivingly connected to an internal combustion engine, a rotary electric machine, a speed change mechanism drivingly connected to the rotary electric machine, an output member drivingly connected to the speed change mechanism and wheels, and an engagement device that is capable of changing the state of engagement between the input member and the speed change mechanism.

DESCRIPTION OF THE RELATED ART

As conventional techniques of a vehicle drive device such as described above, there are techniques described in, for example, Japanese Patent Application Publication No. 2011-105192 (JP 2011-105192 A) and Japanese Patent Application Publication No. 2010-196867 (JP 2010-196867 A). Note that, in the description of this Description of the Related Art section, names of relevant members in JP 2011-105192 A and JP 2010-196867 A will be cited in square member [input shaft 32] and an rotary electric machine [electric motor 1] in a power transmission path, and thus, the state of engagement of the engagement device is changed. Here, the electric pump is a hydraulic pump driven by an rotary electric machine dedicated to hydraulic control separately from the rotary electric machine [electric motor 1] serving as a source of vehicle driving force.

With such a structure, the discharge performance of the pump could be insufficient if a small-sized pump is used as the electric pump in order to improve mountability of the vehicle drive device to the vehicle. Although it is conceivable to cover the insufficiency in the discharge performance by increasing the number or diameter of friction plates, increasing the number or diameter of the friction plates could lead to an increase in size of the engagement device. Therefore, downsizing of the vehicle drive device has its own limits.

JP 2010-196867 A describes a structure in which a hydraulic unit [first clutch hydraulic unit 6] that controls hydraulic pressure supplied to an engagement device [first clutch CL1] is provided in a hydraulic pressure control device [AT hydraulic pressure control valve unit CVU] that controls hydraulic pressure supplied from a mechanical pump [mechanical pump OP]. Here, the mechanical pump is a hydraulic pump driven by a source of vehicle driving force. With such a structure, the discharge performance of the pump is more easily ensured than with the structure of JP 2011-105192 A. Therefore, there is less necessity of the countermeasure of covering the insufficiency in the discharge performance of the pump by increasing the number or diameter of the friction plates. However, with the structure described in JP 2010-196867 A, the distance from the hydraulic unit to a servo oil chamber [hydraulic pressure chamber 53] of the engagement device is likely to be long, and thus, the engagement device could deteriorate in response and controllability.

SUMMARY OF THE INVENTION

Therefore, it is desired to realize a vehicle drive device that easily ensures response and controllability of an engagement device while suppressing the engagement device from increasing in size.

According to an aspect of the present invention, a vehicle drive device includes an input member drivingly connected to an internal combustion engine; a rotary electric machine; a speed change mechanism drivingly connected to the rotary electric machine; an output member drivingly connected to the speed change mechanism and wheels; an engagement device capable of changing a state of engagement between the input member and the speed change mechanism; a hydraulic pump that discharges oil by being driven by the internal combustion engine or the rotary electric machine; a first hydraulic pressure control device that controls hydraulic pressure supplied from the hydraulic pump and supplies the controlled hydraulic pressure to the speed change mechanism; a second hydraulic pressure control device that is provided separately from the first hydraulic pressure control device and that controls the hydraulic pressure supplied from the hydraulic pump and supplies the controlled hydraulic pressure to the engagement device; and a case that houses the rotary electric machine, the speed change mechanism, the engagement device, and the hydraulic pump. According to the aspect of the present invention, at least the engagement device is housed in a first housing space formed by the case, and the second hydraulic pressure control device is provided at a part of the case forming the first housing space.

In the present application, the term "drivingly connected" refers to a state in which two rotational elements are connected so as to be capable of transmitting driving force, and is used as a concept including a state in which the two rotational elements are connected so as to rotate as a unit with each other, or a state in which the two rotational elements are connected so as to be capable of transmitting the driving force via one or two or more transmitting members. Such transmitting members include various members that transmit rotation at the same speed or at a changed speed, such as shafts, gear mechanisms, belts, and chains. Such transmitting members may also include engagement devices that selectively transmit the rotation and the driving force, such as friction engagement device and meshing type engagement devices.

In addition, in the present application, the term "rotary electric machine" is used as a concept including all of a motor (electric motor), a generator (electric generator), and a motor-generator that serves as a motor or a generator depending on the necessity.

According to the aspect, the hydraulic pressure supplied from the hydraulic pump can be controlled by the second hydraulic pressure control device, and the controlled hydraulic pressure can be supplied to the engagement device. Here, the hydraulic pump is driven by the internal combustion engine or the rotary electric machine serving as a source of vehicle driving force, and thus, the discharge performance of such a hydraulic pump is ensured relatively easily. Accordingly, the engagement device can be suppressed from increasing in size due to insufficient discharge performance of the hydraulic pump.

According to the aspect, the second hydraulic pressure control device that supplies the hydraulic pressure to the engagement device is provided at the part of the case forming the first housing space that houses the engagement device. Accordingly, the distance between the engagement device and the second hydraulic pressure control device is small, and thus, response and controllability of the engagement device is easily ensured.

Here, the vehicle drive device according to the present invention may be structured such that the rotary electric machine is housed in the first housing space, and the second hydraulic pressure control device is arranged in a position having a portion overlapping with the rotary electric machine when viewed in a radial direction of the rotary electric machine.

In the present application, the expression like "having a portion overlapping when viewed in a predetermined direction" indicates that, when the predetermined direction is assumed as a direction of line of sight, and a viewing point is moved in various directions perpendicular to the direction of line of sight, at least some area includes the viewing point from which two members look overlapping with each other.

According to this structure, the length in the axial direction of a space occupied by the second hydraulic pressure control device and the rotary electric machine can be reduced by an amount of overlap therebetween when viewed in the radial direction. Thus, the overall device can be downsized in the axial direction thereof. In addition, the structure of the case can be more simplified than in the case of providing an electric machine housing space for housing the rotary electric machine separately from the first housing space.

The vehicle drive device according to the present invention may also be structured such that the second hydraulic pressure control device is arranged in a position having a portion overlapping with the engagement device when viewed in a radial direction of the engagement device.

According to this structure, the engagement device can be arranged near the second hydraulic pressure control device that supplies the hydraulic pressure to the engagement device. Accordingly, the distance between the engagement device and the second hydraulic pressure control device is suppressed to be small, and thus, response and controllability of the engagement device is easily ensured.

The vehicle drive device according to the present invention may also be structured such that the second hydraulic pressure control device includes a solenoid valve that controls at least the hydraulic pressure supplied to the engagement device and a valve body provided with an oil passage that communicates with the solenoid valve.

According to this structure, the second hydraulic pressure control device is easily structured as an integrated component, and thus, an assembly process can be simplified.

The vehicle drive device according to the present invention may also be structured such that the second hydraulic pressure control device is housed in a second housing space formed separately from the first housing space by the case, and be structured to further include a communicating oil passage through which the first housing space communicates with the second housing space.

According to this structure, oil discharged from an oil discharge port of the second hydraulic pressure control device can be fed to the first housing space via the communicating oil passage. Thereby, the hydraulic pressure in the second housing space can be suppressed from rising rapidly due to the pressure (discharge pressure) of the oil discharged from the oil discharge port of the second hydraulic pressure control device, and thus, the second hydraulic pressure control device can be suppressed from deteriorating in controllability when the oil is discharged from the discharge port. Note that the space that communicates with the second housing space via the communicating oil passage is the first housing space formed by the part of the case in which the second hydraulic pressure control device is provided. Accordingly, the length of the communicating oil passage is small, and thus, the flow resistance of oil in the communicating oil passage is easily suppressed to be small.

The vehicle drive device according to the present invention may also be structured such that the rotary electric machine is housed in the first housing space and the speed change mechanism is housed in a speed change mechanism housing space formed by the case, such that the rotary electric machine is supplied with oil from the hydraulic pump, and such that the speed change mechanism housing space is provided therebelow with a first oil retaining portion that communicates with the speed change mechanism housing space and is capable of retaining oil, and the first housing space is provided therebelow with a second oil retaining portion that communicates with the first housing space and an oil discharge port of the second hydraulic pressure control device and is capable of retaining oil, and be structured to further include a discharge oil passage that discharges oil in the second oil retaining portion to the first oil retaining portion.

According to this structure, both of the oil supplied to the rotary electric machine and the oil discharged from the oil discharge port of the second hydraulic pressure control device can be recovered into the second oil retaining portion, and these oils can be together discharged to the first oil retaining portion via the discharge oil passage. Accordingly, the structure of the oil passage can be more simplified so as to discharge the oil more efficiently to the first oil retaining portion than in the case of discharging the oil supplied to the rotary electric machine and the oil discharged from the oil discharge port of the second hydraulic pressure control device to the first oil retaining portion via respective separate oil passages. As a result, the production cost of the device can be reduced, and the overall device can be downsized.

The vehicle drive device according to the present invention may also be structured such that the rotary electric machine is housed in the first housing space and the speed change mechanism is housed in the speed change mechanism housing space formed by the case, and the case is structured to be separable into a first case portion forming the first housing space and a second case portion forming the speed change mechanism housing space, and such that the second hydraulic pressure control device is provided in the first case portion.

According to this structure, most of the portion on the speed change mechanism side can be used commonly by a drive device provided with a rotary electric machine and a drive device not provided with a rotary electric machine, and thus, the production cost can be suppressed.

The vehicle drive device according to the present invention may be structured such that the second hydraulic pressure control device is provided at a lower portion of the first case portion in the structure in which the second hydraulic pressure control device is provided in the first case portion as described above.

According to this structure, the second hydraulic pressure control device can be arranged while satisfying conditions on mountablity to a vehicle.

The vehicle drive device of each of the above-described structures may be structured such that the rotary electric machine and the speed change mechanism are drivingly connected to each other via a fluid coupling provided with a coupling input side member drivingly connected to the rotary electric machine and a coupling output side member drivingly connected to the speed change mechanism, such that the engagement device is capable of changing a state of engagement between the input member and the coupling input side member, and such that the first hydraulic pressure control device controls the hydraulic pressure supplied from the hydraulic pump and supplies the controlled hydraulic pressure to the fluid coupling.

In the present application, the term "fluid coupling" is used as a concept including both of a torque converter having a torque amplifying function and an ordinary fluid coupling having no torque amplifying function.

According to this structure, it is possible to appropriately realize a vehicle drive device provided with a fluid coupling.

The vehicle drive device according to the present invention may also be structured such that the rotary electric machine, the fluid coupling, and the engagement device are arranged on a first axial direction side, that is, on one side in an axial direction of the speed change mechanism, relative to the speed change mechanism, and arranged in the order of the rotary electric machine, the fluid coupling, and the speed change mechanism from the first axial direction side toward an opposite side thereof, and such that the engagement device is arranged in a position having a portion overlapping with the rotary electric machine when viewed in the radial direction of the rotary electric machine.

According to this structure, it is easier to suppress to be small the distance between the second hydraulic pressure control device and the engagement device to be supplied with the hydraulic pressure from the second hydraulic pressure control device, while suppressing the distances to be small from the first hydraulic pressure control device to the fluid coupling and the speed change mechanism that are to be supplied with the hydraulic pressure from the first hydraulic pressure control device, than in the case of arranging those members in the order of the fluid coupling, the rotary electric machine, and the speed change mechanism from the first axial direction side toward the opposite side thereof. Accordingly, for the members to be supplied with the hydraulic pressure, response and controllability are easily ensured, and performance to supply the hydraulic pressure is easily ensured.

The vehicle drive device according to the present invention may also be structured such that the rotary electric machine is housed in the first housing space, such that the fluid coupling is housed in a fluid coupling housing space formed by the case, such that the speed change mechanism is housed in the speed change mechanism housing space formed by the case, and such that the first housing space, the speed change mechanism housing space, and the fluid coupling housing space are formed as spaces independent from one another.

According to this structure, even when the rotary electric machine and the speed change mechanism are supplied with oil for cooling or oil for lubrication, the fluid coupling housing space can be a space in which no oil is present around the fluid coupling, and thus, drag loss of oil can be suppressed from occurring when the fluid coupling rotates.

DETAILED DESCRIPTION OF THE EMBODIMENTS

An embodiment of a vehicle drive device according to the present invention will be described with reference to the accompanying drawings. In the following description, unless particularly specified, an "axial direction L", a "radial direction R", and a "circumferential direction" are defined with reference to a shaft center (shaft center X shown in FIG. 2) of an input shaft of a speed change mechanism TM (a speed change input shaft, that is an intermediate shaft M in the present example). In the present embodiment, a rotary electric machine MG, a first clutch C1, and a torque converter TC are all arranged on the same axis as that of the speed change mechanism TM. Accordingly, an "axial direction", a "radial direction", and a "circumferential direction" of each of the rotary electric machine MG, the first clutch C1, and the torque converter TC coincide with the "axial direction L", the "radial direction R", and the "circumferential direction", respectively, of the speed change mechanism TM. A "first axial direction L1" represents a direction from an output shaft of the speed change mechanism TM (a speed change output shaft, that is, an output shaft O in the present embodiment) toward the speed change input shaft (leftward in FIG. 2) along the axial direction L, and a "second axial direction L2" represents an opposite direction to the first axial direction L1 (rightward in FIG. 2). In addition, a "radially inward direction R1" represents an inward direction along the radial direction R while a "radially outward direction R2" represents an outward direction along the radial direction R.

In the following description, the expressions such as "up/upper/above" and "down/lower/below" are defined with reference to a vertical direction V (refer to FIG. 2) in the state in which a vehicle drive device 1 is mounted on a vehicle (vehicle-mounted state). The expression such as "up", "upper", or "above" represents the upper side in FIG. 2 while the expression such as "down", "lower", or "below" represents the lower side in FIG. 2. A direction with respect to each member represents a direction in the state in which the member is assembled to the vehicle drive device 1. Each term regarding the direction, position, or the like with respect to each member is used as a concept including a state of having a difference due to an allowable error in manufacturing.

1. Overall Structure of Vehicle Drive Device

Figure 1:
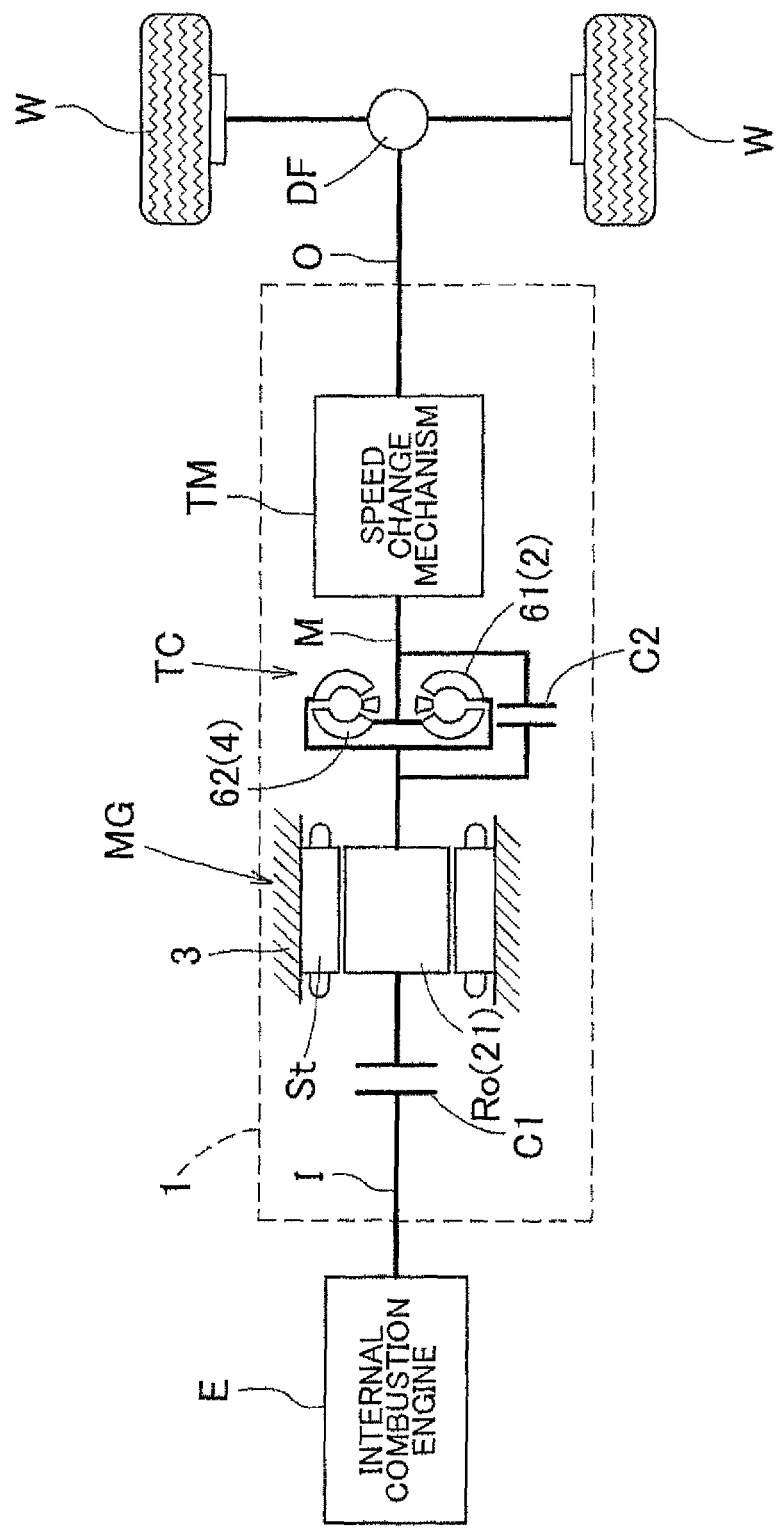
FIG. 1 is a schematic diagram showing an outline structure of a vehicle drive device according to an embodiment of the present invention.

FIG. 1 is a schematic diagram showing an outline structure of the vehicle drive device 1 according to the present embodiment. As shown in FIG. 1, the vehicle drive device 1 is provided with an input shaft I drivingly connected to an internal combustion engine E, the rotary electric machine MG, the torque converter TC, the speed change mechanism TM, the output shaft O drivingly connected to the speed change mechanism TM and wheels W, and a case 3. The torque converter TC is provided with a coupling input side member 2 drivingly connected to the rotary electric machine MG and a coupling output side member 4 paired with the coupling input side member 2. The speed change mechanism TM is drivingly connected to the coupling output side member 4 via the intermediate shaft M. That is, in the present embodiment, the speed change mechanism TM is drivingly connected to the rotary electric machine MG via the torque converter TC. The vehicle drive device 1 is further provided with the first clutch C1 that is capable of changing the state of engagement between the input shaft I and the speed change mechanism TM. In the present embodiment, the rotary electric machine MG and the speed change mechanism TM are drivingly connected to each other via the torque converter TC, and the first clutch C1 changes the state of engagement between the input shaft I and the speed change mechanism TM by changing the state of engagement between the input shaft I and the coupling input side member 2. The members are arranged along a power transmission path between the input shaft I and the output shaft O, as shown in FIG. 1, from the side of the input shaft I in the order of the first clutch C1, the rotary electric machine MG, the torque converter TC, and the speed change mechanism TM. In the present embodiment, the input shaft I and the output shaft O correspond to an "input member" and an "output member", respectively, in the present invention. In the present embodiment, the first clutch C1 and the torque converter TC correspond to an "engagement device" and a "fluid coupling", respectively, in the present invention.

The internal combustion engine E is a motor to take out power by being driven by combustion of fuel inside the engine. For example, a gasoline engine or a diesel engine can be used as the internal combustion engine E. In the present embodiment, the input shaft I is drivingly connected to an output shaft (such as a crankshaft) of the internal combustion engine E via a damper 16 (refer to FIG. 2 although omitted in FIG. 1). The input shaft I can also be structured to be drivingly connected to the output shaft of the internal combustion engine E not through the damper 16. The input shaft I can also be structured to be provided as a unit with either one (such as the output shaft of the internal combustion engine E) of the two members to be drivingly connected to, or can be structured to be provided as a separate body from both of the two members.

The first clutch C1 is provided between the input shaft I and the rotary electric machine MG (a rotor member 21) in the power transmission path, and serves as an internal combustion engine cut-off clutch that disconnects the internal combustion engine E from the wheels W. The speed change mechanism TM is composed of a mechanism that is capable of changing a speed ratio in a stepwise manner or in a stepless manner (such as an automatic stepped speed change mechanism). The speed change mechanism TM changes a rotational speed of the intermediate shaft M (speed change input shaft) drivingly connected to the coupling output side member 4 at a predetermined speed ratio, and transmits the changed speed to the output shaft O (speed change output shaft) drivingly connected to a differential gear unit DF for output.

The output shaft O is drivingly connected to the wheels W via the differential gear unit DF for output. The rotation and torque transmitted to the output shaft O are distributed and transmitted, via the differential gear unit DF for output, to the two right and left wheels W. Thereby, the vehicle drive device 1 can run the vehicle by transmitting the torque of one or both of the internal combustion engine E and the rotary electric machine MG. That is, the vehicle drive device 1 is structured as a drive device for a hybrid vehicle, and specifically, structured as a one-motor parallel type hybrid drive device. The output shaft O can also be structured to be provided as a unit with either one (such as a drive shaft) of the two members to be drivingly connected to, or can be structured to be provided as a separate body from both of the two members.

In the present embodiment, all of the input shaft I, the first clutch C1, the rotary electric machine MG, the torque converter TC, the intermediate shaft M, the speed change mechanism TM, and the output shaft O are arranged on the shaft center X (refer to FIG. 2), and the vehicle drive device 1 according to the present embodiment has a single-axis structure suitable for being mounted on a vehicle of an FR (front engine, rear drive) type.

2. Structures of Various Parts of Vehicle Drive Device

Figure 2:
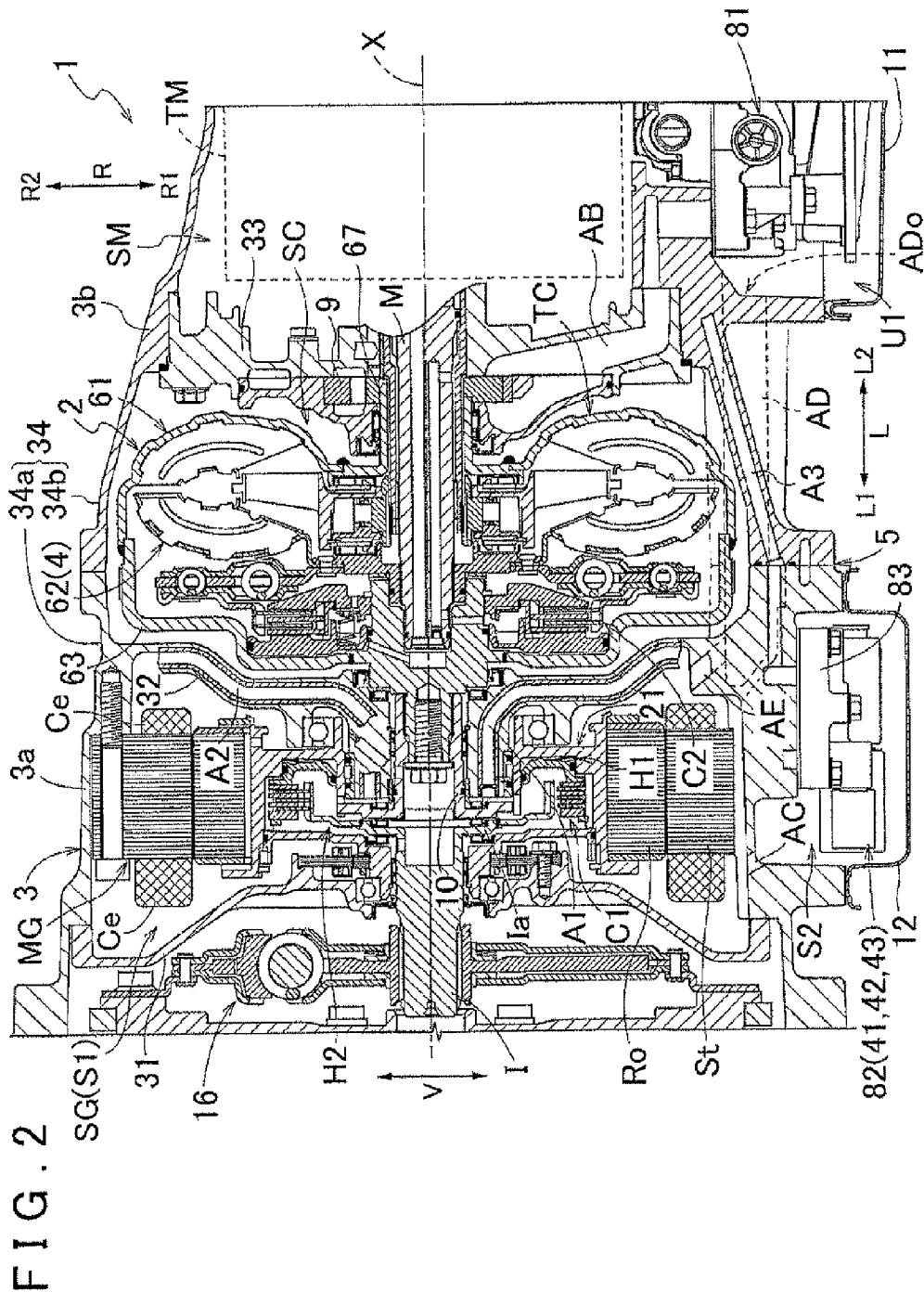
FIG. 2 is a partial cross-sectional view of the vehicle drive device according to the embodiment of the present invention.
Figure 3:
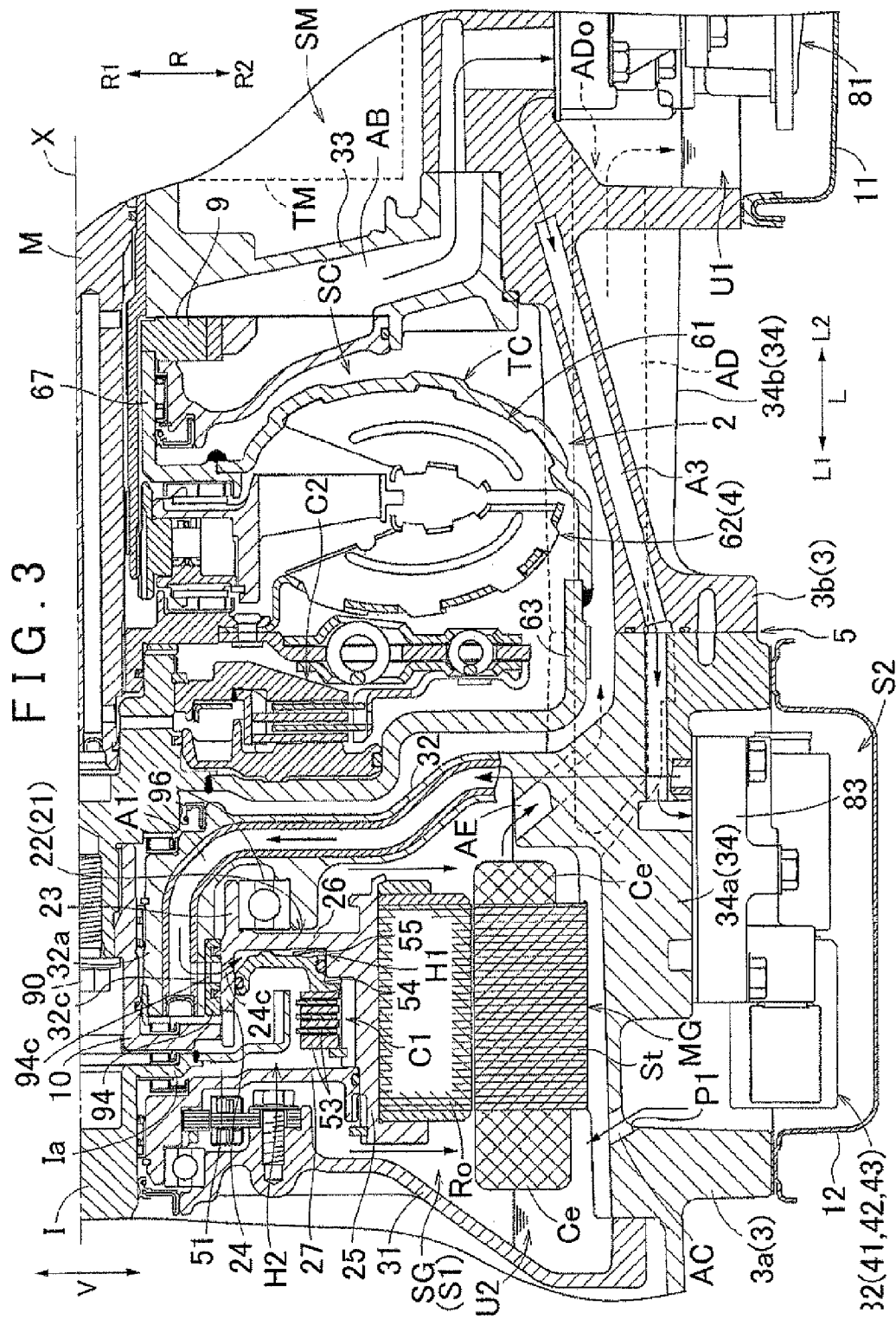
FIG. 3 is an enlarged view of a part of FIG. 2.
Figure 4:
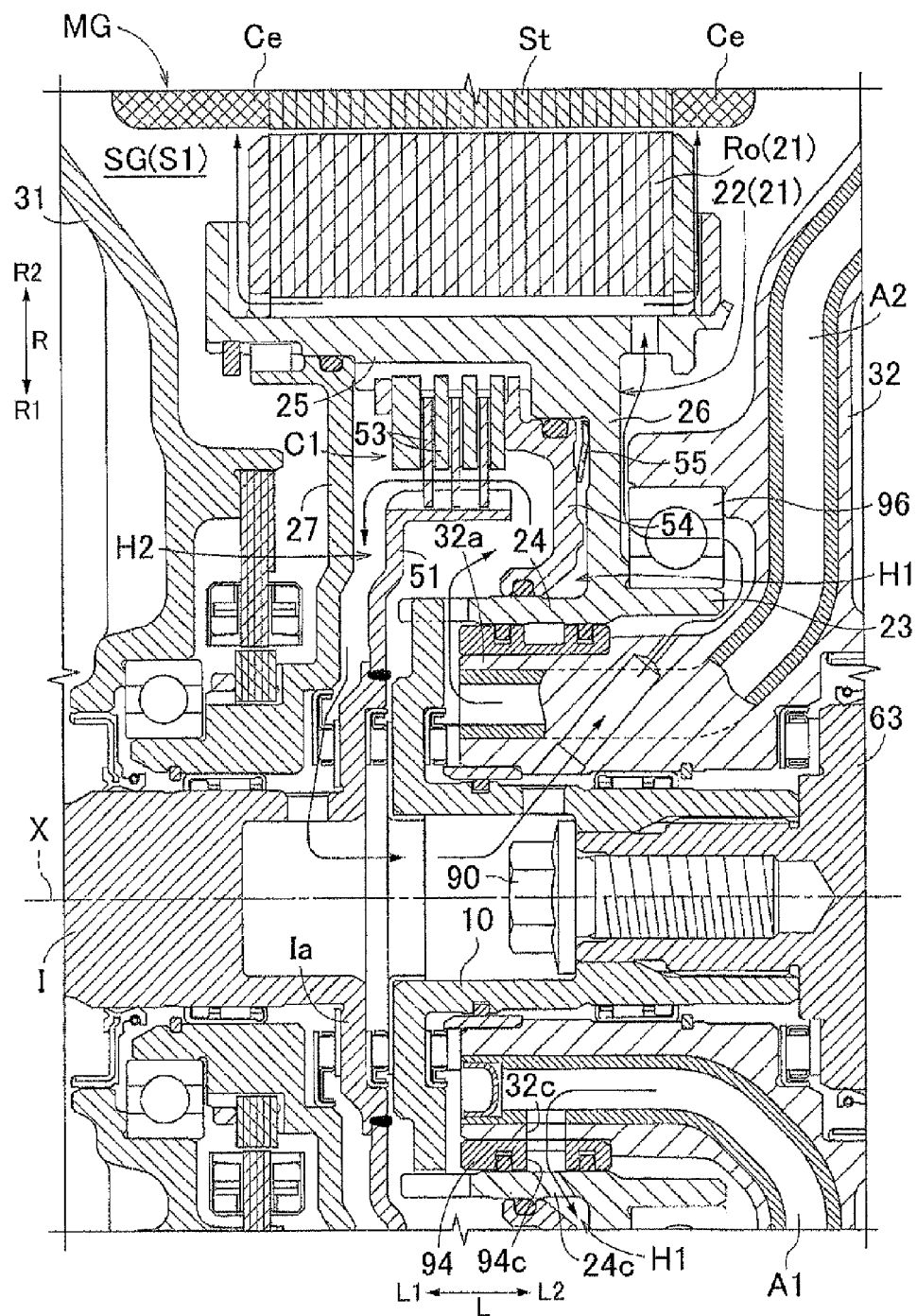
FIG. 4 is an enlarged view of a part of FIG. 2.
Figure 5:
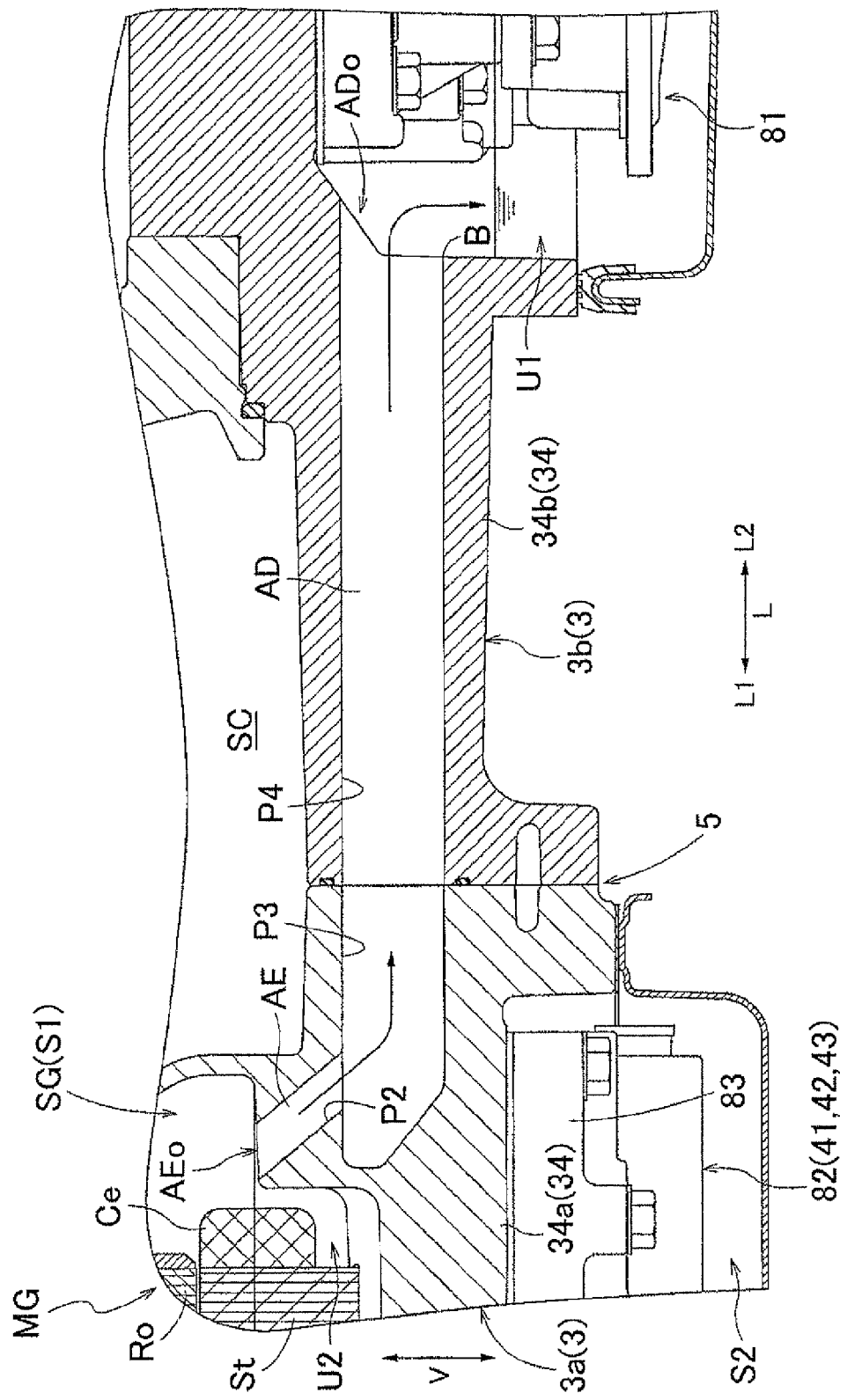
FIG. 5 is a partial cross-sectional view of the vehicle drive device according to the embodiment of the present invention, taken at a location different from that of FIG. 2.

Next, structures of various parts of the vehicle drive device 1 according to the present embodiment will be described with reference to FIGS. 2 to 5. FIG. 2 is a cross-sectional view taken by cutting a part of the vehicle drive device 1 according to the present embodiment along a vertical plane including the shaft center X. FIGS. 3 and 4 are enlarged views of parts of FIG. 2. FIG. 5 is a cross-sectional view taken by cutting a part of the vehicle drive device 1 according to the present embodiment along a vertical plane in parallel with the shaft center X at a location different in the horizontal direction from that of FIG. 2. FIGS. 2 and 3 omit to show a specific structure of the speed change mechanism TM.

2-1. Rotary Electric Machine

As shown in FIG. 2, the rotary electric machine MG is provided with a stator St and the rotor member 21. The stator St is fixed to the case 3 and is provided with coil end portions Ce at both ends in the axial direction L thereof. As shown in FIG. 3, the rotor member 21 is provided with a rotor Ro arranged in a manner opposed to the stator St and a rotor support member 22 that rotatably supports the rotor Ro relative to the case 3. In the present embodiment, the rotor Ro is arranged on the radially inward direction R1 side of the stator St, and the rotor support member 22 is formed so as to extend in the radially inward direction R1 from the rotor Ro and supports the rotor Ro from the radially inward direction R1 side.

In the present embodiment, as shown in FIGS. 3 and 4, the rotor support member 22 is provided with a rotor holding portion 25 that holds the rotor Ro and with a radially extending portion 26. The rotor holding portion 25 is formed in a cylindrical shape having an outer circumferential portion in contact with an inner circumferential surface of the rotor Ro and having a flange portion in contact with a side face in the axial direction L of the rotor Ro. The radially extending portion 26 is formed in an annular plate shape that extends in the radially inward direction R1 from a portion on the second axial direction L2 side relative to a central portion in the axial direction L of the rotor holding portion 25. The radially extending portion 26 is provided, at an end in the radially inward direction R1 thereof, with a first axially projecting portion 23 that is a cylindrical projecting portion projecting in the second axial direction L2 and with a second axially projecting portion 24 that is a cylindrical projecting portion projecting in the first axial direction L1. The first axially projecting portion 23 serves as a supported portion that is rotatably supported in the radial direction R by a bearing 96 relative to the case 3 (specifically, a second support wall 32 to be described later). The second axially projecting portion 24 constitutes a connecting portion with a connecting member 10 to be described later.

A plate-shaped member 27 having an annular plate shape is mounted on the rotor support member 22 so as to rotate as a unit therewith. The plate-shaped member 27 is mounted on the first axial direction L1 side relative to the central portion in the axial direction L of the rotor holding portion 25. Thereby, on the radially inward direction R1 side of the rotor holding portion 25, a space is formed that is partitioned off by the rotor holding portion 25 on the radially outward direction R2 side and partitioned off by the radially extending portion 26 and the plate-shaped member 27 on both sides in the axial direction L. This space is provided as a space partitioned off so as to be oil-tight using seal members or the like appropriately arranged at various parts, and is formed therein with an operating oil pressure chamber H1 and a circulating oil pressure chamber H2 of the first clutch C1 to be described later.

2-2. First Clutch

The first clutch C1 is an engagement device that is capable of changing the state of engagement by being operated by hydraulic pressure. The first clutch C1 is structured so as to be capable of changing the state of engagement of two engagement members engaged by the first clutch C1 between a state in which the two engagement members are engaged with each other (including a slip-engaged state) and a state in which the two engagement members are not engaged with each other (a released state). Driving force is transmitted between the input shaft I and the rotor member 21 in the state in which the two engagement members are engaged with each other, while the driving force is not transmitted between the input shaft I and the rotor member 21 in the state in which the two engagement members are released from each other.

As shown in FIGS. 3 and 4, the first clutch C1 is arranged in the oil-tight space that is partitioned off by the rotor holding portion 25 on the radially outward direction R2 side and partitioned off by the radially extending portion 26 and the plate-shaped member 27 on both sides in the axial direction L. With this arrangement, the first clutch C1 is arranged in a position having a portion overlapping with the rotary electric machine MG when viewed in the radial direction of the rotary electric machine MG (in the present example, in the same direction as the radial direction R). Specifically, the first clutch C1 is arranged on the radially inward direction R1 side relative to the rotor Ro and in a position overlapping with the central portion area in the axial direction L of the rotor Ro when viewed in the radial direction R.

In the present embodiment, the first clutch C1 is structured as a wet-type multi-plate clutch mechanism. Specifically, the first clutch C1 is provided with a clutch hub 51, friction members 53, a piston 54, and an urging member 55, and these members are all arranged in positions each having a portion overlapping with the rotor Ro when viewed in the radial direction R. In the present example, the rotor holding portion 25 of the rotor support member 22 serves as a clutch drum. The first clutch C1 has, as the friction members 53, input-side friction members and output-side friction members serving as respective pairs. The input-side friction members are supported from the radially inward direction R1 side by an outer circumferential portion of the clutch hub 51, while the output-side friction members are supported from the radially outward direction R2 side by an inner circumferential portion of the rotor holding portion 25. The clutch hub 51 is connected, at an end in the radially inward direction R1 thereof, to a flange portion 1a of the input shaft I.

As shown in FIG. 4, the operating oil pressure chamber H1 of the first clutch C1 is formed by being surrounded by the radially extending portion 26 and the second axially projecting portion 24 of the rotor support member 22 and by the piston 54. The circulating oil pressure chamber H2 of the first clutch C1 is formed by mainly being surrounded by the rotor holding portion 25 (clutch drum) of the rotor support member 22, the plate-shaped member 27 mounted on the rotor support member 22, and the piston 54, and houses therein the clutch hub 51 and the friction members 53. The operating oil pressure chamber H1 and the circulating oil pressure chamber H2 are arranged separately on both sides in the axial direction L relative to the piston 54, and partitioned off from each other so as to be oil-tight using the seal members. In the present embodiment, both of the operating oil pressure chamber H11 and the circulating oil pressure chamber H2 are arranged on the radially inward direction R1 side relative to the rotor Ro and in positions overlapping, over the whole areas in the axial direction L thereof, with the rotor Ro when viewed in the radial direction R.

The urging member 55 presses the piston 54 toward the friction members 53 in the axial direction L (in the present example, in the first axial direction L1). Thereby, the first clutch C1 is engaged or released according to a balance between the pressing force of the piston 54 in the first axial direction L1 by the hydraulic pressure in the operating oil pressure chamber H1 and the urging member 55 and the pressing force of the piston 54 in the second axial direction L2 by the hydraulic pressure in the circulating oil pressure chamber H2. That is, in the present embodiment, the piston 54 is slid along the axial direction L depending on the difference in hydraulic pressure (differential pressure) between the operating oil pressure chamber H1 and the circulating oil pressure chamber H2, and thus, the state of engagement of the first clutch C1 can be controlled. While the vehicle is running, the circulating oil pressure chamber H2 is basically filled with oil at a predetermined pressure or higher, and the oil cools the friction members 53.

2-3. Torque Converter

The torque converter TC is provided with the coupling input side member 2 that is drivingly connected to the rotor member 21 of the rotary electric machine MG and with the coupling output side member 4 that is paired with the coupling input side member 2 and drivingly connected to the wheels W. Specifically, as shown in FIG. 2, the torque converter TC is provided with a pump impeller 61, a turbine runner 62, a second clutch C2 serving as a lock-up clutch, and a cover portion 63 housing these parts. The cover portion 63 is connected so as to rotate as a unit with the pump impeller 61 that is arranged inside thereof, and also connected so as to rotate as a unit with a pump drive shaft 67 to be described later. In the present embodiment, the coupling input side member 2 is composed of the pump impeller 61, the cover portion 63, and the pump drive shaft 67. The coupling output side member 4 is composed of the turbine runner 62, which in turn is connected (in the present example, connected via splines) to the intermediate shaft M. Thereby, as shown in FIG. 1, the coupling output side member 4 is drivingly connected to the wheels W via the intermediate shaft M, the speed change mechanism TM, the output shaft O, and the differential gear unit DF for output.

In the present embodiment, the coupling input side member 2 is connected, via the connecting member 10, to the rotor member 21 so as to rotate as a unit with each other. Although details will be described later, the second support wall 32 of the case 3 is formed with a tubular projecting portion 32a as shown in FIG. 4. The connecting member 10 has a tubular axially extending portion that extends in the axial direction L through the side in the radially inward direction R1 of the tubular projecting portion 32a and an annular plate-shaped radially extending portion that extends in the radial direction R on the first axial direction L1 side relative to the tubular projecting portion 32a. The cover portion 63 constituting the coupling input side member 2 is connected via splines to the axially extending portion of the connecting member 10, and the cover portion 63 and the connecting member 10 are fixed to each other so as to be relatively immovable in the axial direction by using a fastening member 90. The second axially projecting portion 24 of the rotor member 21 is connected so as to rotate as a unit with the radially extending portion of the connecting member 10 in a state relatively movable in the axial direction L. Thereby, the coupling input side member 2 and the rotor member 21 are drivingly connected so as to rotate as a unit with each other.

2-4. Case

The case 3 houses the rotary electric machine MG, the torque converter TC, the speed change mechanism TM, and the first clutch C1. In the present embodiment, as shown in FIG. 2, the case 3 is provided with a first support wall 31, the second support wall 32, a third support wall 33, and a peripheral wall 34. The peripheral wall 34 is formed into a generally cylindrical shape covering an outer periphery of the rotary electric machine MG, the first clutch C1, the torque converter TC, the speed change mechanism TM, and the like. The first support wall 31, the second support wall 32, and the third support wall 33 are arranged in the listed order from the first axial direction L1 side so as to partition off, in the axial direction L, a space in the case formed in the radially inward direction R1 of the peripheral wall 34.

As shown in FIG. 2, the case 3 is formed with a first housing space S1 that houses at least the first clutch C1, a rotary electric machine housing space SG that houses the rotary electric machine MG, a fluid coupling housing space SC that houses the torque converter TC, and a speed change mechanism housing space SM that houses the speed change mechanism TM. In the present embodiment, the first housing space S1 and the rotary electric machine housing space SG are formed as the same space. That is, in the present embodiment, the rotary electric machine MG can be said to be housed in the first housing space S1. The rotary electric machine housing space SG (first housing space S1), the fluid coupling housing space SC, and the speed change mechanism housing space SM are formed in the listed order from the first axial direction L1 side. Thereby, in the present embodiment, the rotary electric machine MG and the first clutch C1, the torque converter TC, and the speed change mechanism TM are arranged in this order in the second axial direction L2 from the first axial direction L1 side. That is, the rotary electric machine MG, the first clutch C1, and the torque converter TC are arranged on the first axial direction L1 side relative to the speed change mechanism TM. The rotary electric machine housing space SG (first housing space S1), the fluid coupling housing space SC, and the speed change mechanism housing space SM are also formed as spaces independent from one another. Here, the expression "spaces independent from one another" means that the spaces are partitioned off from one another so as to be oil-tight. Such a structure is achieved by appropriately arranging seal members at various parts.

The rotary electric machine housing space SG, the fluid coupling housing space SC, and the speed change mechanism housing space SM are all formed as annular spaces. Specifically, the rotary electric machine housing space SG is formed between the first support wall 31 and the second support wall 32 in the axial direction L. The fluid coupling housing space SC is formed between the second support wall 32 and the third support wall 33 in the axial direction L. The speed change mechanism housing space SM is formed between the third support wall 33 and a support wall (not shown) arranged on the second axial direction L2 side relative to the third support wall 33 in the axial direction L. The rotary electric machine housing space SG, the fluid coupling housing space SC, and the speed change mechanism housing space SM are all partitioned off by the peripheral wall 34 on the second axial direction L2 side. The damper 16 is housed in a space on the first axial direction L1 side relative to the first support wall 31 in the case 3.

The first housing space S1 communicates with a second housing space S2 to be described later via a first communicating oil passage AC. In the present embodiment, the rotary electric machine housing space SG and the second housing space S2 communicate with each other via the first communicating oil passage AC because the first housing space S1 and the rotary electric machine housing space SG are formed as the same space in the present embodiment, as described above.

In the present embodiment, as shown in FIG. 2, the case 3 is structured to be separable into a first case portion 3a and a second case portion 3b arranged on the second axial direction L2 side relative to the first case portion 3a. The first case portion 3a and the second case portion 3b are connected to each other at a joint portion 5. In the present embodiment, they are fastened to each other at respective portions of the peripheral wall 34 by fastener bolts (not shown). In the following description, a portion of the peripheral wall 34 constituted by the first case portion 3a will be called a first peripheral wall 34a while a portion of the peripheral wall 34 constituted by the second case portion 3b will be called a second peripheral wall 34b.

The first case portion 3a is a portion that forms the first housing space S1. In the present embodiment, the first case portion 3a is also a portion that forms the rotary electric machine housing space SG. Specifically, the first case portion 3a has the first support wall 31 and the second support wall 32, and the first housing space S1 (rotary electric machine housing space SG) is formed by only the first case portion 3a. In the present embodiment, the first case portion 3a further forms a housing space for the damper 16. The second case portion 3b is a portion that forms the speed change mechanism housing space SM. Specifically, the second case portion 3b has the third support wall 33, and the speed change mechanism housing space SM is formed by only the second case portion 3b. The first case portion 3a and the second case portion 3b cooperate to form the fluid coupling housing space SC in an area including, in the axial direction L, the joint portion 5 of the first case portion 3a and the second case portion 3b.

2-4-1. First Support Wall

The first support wall 31 is formed, as shown in FIG. 2, so as to extend in the radial direction R and the circumferential direction on the first axial direction L1 side relative to the rotary electric machine MG (in the present example, between the rotary electric machine MG and the damper 16 in the axial direction L). A through-hole is formed so as to extend in the axial direction L in the central portion in the radial direction R of the first support wall 31 that is formed in a disc shape, and the input shaft I is inserted in this through-hole. The first support wall 31 is formed such that a portion on the radially inward direction R1 side thereof is offset as a whole in the axial direction L so as to be located on the second axial direction L2 side relative to a portion on the radially outward direction R2 side thereof.

2-4-2. Second Support Wall

The second support wall 32 is formed, as shown in FIG. 2, so as to extend in the radial direction R and the circumferential direction between the rotary electric machine MG and the torque converter TC in the axial direction L. A through-hole passing through in the axial direction L is formed in the central portion in the radial direction R of the second support wall 32 that is formed in a disc shape, and the connecting member 10 is arranged in this through-hole. The coupling input side member 2 arranged on the second axial direction L2 side relative to the second support wall 32 is drivingly connected so as to rotate as a unit with the rotor member 21 arranged on the first axial direction L1 side via the connecting member 10.

The second support wall 32 is formed such that a portion on the radially inward direction R1 side thereof is offset as a whole in the axial direction L so as to be located on the first axial direction L1 side relative to a portion on the radially outward direction R2 side thereof. As shown in FIG. 4, an end on the radially inward direction R1 side of the second support wall 32 is formed with the tubular projecting portion 32a that projects in the first axial direction L1, and thus, the second support wall 32 has a thick-walled portion (boss) having a predetermined thickness in the axial direction L at the end on the radially inward direction R1 side. The tubular projecting portion 32a is arranged on the radially inward direction R1 side relative to the rotor member 21 and in a position having a portion overlapping with the rotor member 21 when viewed in the radial direction R.

A first oil passage A1 and a second oil passage A2 are formed inside the second support wall 32. As shown in FIGS. 3 and 4, the first oil passage A1 communicates with the operating oil pressure chamber H1 of the first clutch C1, and serves as an oil supply passage for supplying oil for operating the piston 54 to the operating oil pressure chamber H1. As shown in FIG. 4, the second oil passage A2 communicates with the circulating oil pressure chamber H2 of the first clutch C1, and serves as an oil supply passage for supplying oil for cooling the friction members 53 to the circulating oil pressure chamber H2. As shown in FIG. 4, the first oil passage A1 extends in the first axial direction L1 inside the tubular projecting portion 32a, and then, communicates with the operating oil pressure chamber H1 via a communication hole 32c formed in the tubular projecting portion 32a, a through-hole 94c formed in a sleeve member 94, and a through-hole 24c formed in the second axially projecting portion 24 of the rotor support member 22. Here, the sleeve member 94 is provided for restricting the oil from flowing in the axial direction L through a gap in the radial direction between an outer circumferential surface of the tubular projecting portion 32a and an inner circumferential surface of the second axially projecting portion 24.

As shown in FIG. 4, the second oil passage A2 is formed so as to extend in the first axial direction L1 inside the tubular projecting portion 32a, and then to open at an end face on the first axial direction L1 side of the tubular projecting portion 32a. The opening of the second oil passage A2 opens to a gap formed and extending in the axial direction L between the connecting member 10 and the tubular projecting portion 32a. A connecting portion of the second axially projecting portion 24 with the connecting member 10 is formed with a gap that passes in the radial direction R through the second axially projecting portion 24. The second oil passage A2 communicates with the circulating oil pressure chamber H2 via these two gaps.

2-4-3. Third Support Wall

The third support wall 33 is formed, as shown in FIG. 2, so as to extend in the radial direction R and the circumferential direction on the second axial direction L2 side relative to the torque converter TC (in the present example, between the torque converter TC and the speed change mechanism TM in the axial direction L). A through-hole is formed so as to extend in the axial direction L in the central portion in the radial direction R of the third support wall 33 that is formed in a disc shape, and the intermediate shaft M is inserted in this through-hole. The third support wall 33 is provided with a hydraulic pump 9 that generates hydraulic pressure for supplying oil to various parts of the vehicle drive device 1. Specifically, the third support wall 33 has a first portion that is fixed to the peripheral wall 34 (specifically, the second peripheral wall 34b) and a second portion that is mounted on an end face on the first axial direction L1 side of the first portion, and a pump chamber of the hydraulic pump 9 is formed in a space partitioned off by the first portion and the second portion on both sides in the axial direction L. Moreover, the third support wall 33 is formed therein with a suction oil passage (not shown) and a discharge oil passage AB of the hydraulic pump 9.

As described above, the pump drive shaft 67 driving the hydraulic pump 9 is drivingly connected so as to rotate as a unit with the pump impeller 61 of the torque converter TC. The pump impeller 61 is drivingly connected, as shown in FIG. 1, to the rotary electric machine MG and the internal combustion engine E. Accordingly, the hydraulic pump 9 is driven by the internal combustion engine E or the rotary electric machine MG serving as a source of driving force of the wheels W, and thereby discharges oil. The hydraulic pressure generated by the hydraulic pump 9 is controlled by a first hydraulic pressure control device 81 to be described later, and the controlled hydraulic pressure is supplied to the torque converter TC and the speed change mechanism TM. The hydraulic pressure generated by the hydraulic pump 9 is also controlled by a second hydraulic pressure control device 82 to be described later, and the controlled hydraulic pressure is supplied to the first clutch C1.

3. Supply Structure of Hydraulic Pressure

Next, a supply structure of hydraulic pressure in the vehicle drive device 1 according to the present embodiment will be described. The vehicle drive device 1 is provided with the first hydraulic pressure control device 81 as a hydraulic pressure control device for controlling the hydraulic pressure supplied from the hydraulic pump 9, and is also provided with the second hydraulic pressure control device 82 separately from the first hydraulic pressure control device 81.

3-1. First Hydraulic Pressure Control Device

The first hydraulic pressure control device 81 is a device that controls the hydraulic pressure supplied from the hydraulic pump 9 and supplies the controlled hydraulic pressure to the torque converter TC and the speed change mechanism TM. As shown in FIG. 2, in the present embodiment, the first hydraulic pressure control device 81 is provided at the second case portion 3b, and in the present example, provided at a lower portion of the second case portion 3b. Specifically, the first hydraulic pressure control device 81 is fixed to an outer circumferential portion (in the present example, to a portion having a downward facing surface in the outer circumferential portion) of the second peripheral wall 34b of the second case portion 3b. In the present embodiment, the first hydraulic pressure control device 81 is arranged in a position having a portion overlapping with the speed change mechanism TM when viewed in the radial direction R which is the radial direction of the speed change mechanism TM. In the present example, although not shown, the first hydraulic pressure control device 81 is arranged in a position overlapping, over the whole area in the axial direction L thereof, with the speed change mechanism TM when viewed in the radial direction R.

Specifically, the case 3 is provided with a first oil pan 11 mounted to a lower portion of the second case portion 3b, and a space surrounded by the second case portion 3b and the first oil pan 11 serves as a first hydraulic pressure control device housing space that houses the first hydraulic pressure control device 81. The first hydraulic pressure control device housing space is formed in a position having a portion overlapping with the speed change mechanism TM when viewed from below. The first hydraulic pressure control device 81 is arranged, while being housed in the first hydraulic pressure control device housing space, in a position having a portion overlapping with the speed change mechanism TM when viewed from below.

The first hydraulic pressure control device 81 is provided with a plurality of hydraulic pressure control valves and oil flow passages. The hydraulic pressure control valves provided in the first hydraulic pressure control device 81 include a speed change mechanism hydraulic pressure control valve (not shown) that controls hydraulic pressure supplied to the speed change mechanism TM and a fluid coupling hydraulic pressure control valve (not shown) that controls hydraulic pressure supplied to the torque converter TC. The hydraulic pressure supplied to the speed change mechanism TM is used for controlling the state of engagement of engagement devices provided in the speed change mechanism TM, and used also for lubricating and cooling gear mechanisms, bearings, and the like provided in the speed change mechanism TM. The hydraulic pressure supplied to the torque converter TC is used for transmitting power in the torque converter TC, and is supplied to an operating oil pressure chamber of the second clutch C2 to be used for controlling the state of engagement of the second clutch C2. The oil after being supplied to the speed change mechanism TM and the torque converter TC is returned to the first oil pan 11 that is arranged below the speed change mechanism TM.

Although details are omitted, a circulation path of oil flowing through the hydraulic pump 9, the first hydraulic pressure control device 81, the torque converter TC, and the speed change mechanism TM is provided with an oil cooler (heat exchanger) for cooling the oil in series or in parallel with the path. The oil cooler is provided in the second case portion 3b. For example, the circulation path can be structured such that the oil supplied to at least a heat-generating portion is returned to the first oil pan 11 via the oil cooler, or such that the oil to be supplied to at least the heat-generating portion is supplied to places to be supplied with the oil via the oil cooler.

As shown in FIG. 3, the oil recovered into the first oil pan 11 is retained in the above-mentioned first hydraulic pressure control device housing space. The first hydraulic pressure control device housing space is formed below the speed change mechanism housing space SM, and communicates with the speed change mechanism housing space SM via an opening formed in the second peripheral wall 34b. Consequently, in the present embodiment, the first hydraulic pressure control device housing space that is formed by being surrounded by the second case portion 3b and the first oil pan 11 constitutes a first oil retaining portion U1. The hydraulic pump 9 suctions the oil retained in the first oil retaining portion U1 and generates the hydraulic pressure.

Line pressure that is the discharge pressure (output pressure) of the hydraulic pump 9 is controlled by a line pressure control valve (not shown). For example, a pressure regulator valve is used as the line pressure control valve, and the line pressure is controlled based on reference pressure supplied to a reference pressure chamber. In the present embodiment, the line pressure control valve is provided in the first hydraulic pressure control device 81, and the pressure controlled (regulated) by the line pressure control valve is supplied to the second hydraulic pressure control device 82 via a third oil passage A3.

3-2. Second Hydraulic Pressure Control Device

The second hydraulic pressure control device 82 is a device that controls the hydraulic pressure supplied from the hydraulic pump 9 and supplies the controlled hydraulic pressure to the first clutch C1. As shown in FIG. 2, in the present embodiment, the second hydraulic pressure control device 82 is provided at the first case portion 3a, and in the present example, provided at a lower portion of the first case portion 3a. The first case portion 3a is a portion that forms the first housing space S1, and the second hydraulic pressure control device 82 is provided in the portion forming the first housing space S1 of the case 3. That is, the second hydraulic pressure control device 82 is provided at a position of the case 3 forming the first housing space S1. Specifically, the second hydraulic pressure control device 82 is fixed to an outer circumferential portion (in the present example, to a portion having a downward facing surface in the outer circumferential portion) of the first peripheral wall 34a of the first case portion 3a. The first case portion 3a is arranged on the first axial direction L1 side relative to the second case portion 3b that is provided with the first hydraulic pressure control device 81. Consequently, in the present embodiment, the second hydraulic pressure control device 82 is arranged on the first axial direction L1 side relative to the first hydraulic pressure control device 81. Specifically, the first hydraulic pressure control device 81 is arranged on the second axial direction L2 side relative to the joint portion 5 of the first case portion 3a and the second case portion 3b, while the second hydraulic pressure control device 82 is arranged on the first axial direction L1 side relative to the joint portion 5. In addition, in the present embodiment, the second hydraulic pressure control device 82 is arranged below an upper end portion of the first hydraulic pressure control device 81.

Specifically, the case 3 is provided with a second oil pan 12 mounted to a lower portion of the first case portion 3a, and a space surrounded by the first case portion 3a and the second oil pan 12 serves as a second hydraulic pressure control device housing space that houses the second hydraulic pressure control device 82. That is, the second hydraulic pressure control device housing space is a space formed by the case 3 separately from the first housing space S1, and constitutes the second housing space S2 that houses the second hydraulic pressure control device 82. The second housing space S2 is formed in a position having a portion overlapping with the rotary electric machine MG when viewed from below, and also is formed in a position having a portion overlapping with the first clutch C1 when viewed from below. Note that the second oil pan 12 is provided independently from the first oil pan 11. That is, the first oil pan 11 and the second oil pan 12 are composed of members different from each other, and are mounted at locations different from each other in the case 3. Specifically, the first oil pan 11 is arranged on the second axial direction L2 side relative to the joint portion 5 of the first case portion 3a and the second case portion 3b, while the second oil pan 12 is arranged on the first axial direction L1 side relative to the joint portion 5.

As shown in FIG. 3, the second hydraulic pressure control device 82 is arranged in a position having a portion overlapping with the rotary electric machine MG when viewed in the radial direction of the rotary electric machine MG (in the present example, in the same direction as the radial direction R). In the present example, the second hydraulic pressure control device 82 is arranged toward the second axial direction L2 side relative to the rotary electric machine MG so that a portion on the first axial direction L1 side of the second hydraulic pressure control device 82 overlaps with the rotary electric machine MG (specifically, the stator St) when viewed in the radial direction R. Moreover, in the present embodiment, the second hydraulic pressure control device 82 is arranged in a position having a portion overlapping with the rotary electric machine MG when viewed from below.

Furthermore, as shown in FIG. 3, the second hydraulic pressure control device 82 is arranged in a position having a portion overlapping with the first clutch C1 when viewed in the radial direction of the first clutch C1 (in the present example, in the same direction as the radial direction R). In the present embodiment, the second hydraulic pressure control device 82 is arranged in a position having a portion overlapping, when viewed in the radial direction R, with all of the clutch hub 51, the piston 54, the friction members 53, the clutch drum (in the present example, the rotor holding portion 25), the operating oil pressure chamber H1, and the circulating oil pressure chamber H2 that constitute the first clutch C1. Note that the second hydraulic pressure control device 82 can also be structured to be arranged in a position having a portion overlapping with only some of these members or oil pressure chambers when viewed in the radial direction R. In this case, the second hydraulic pressure control device 82 is preferably arranged in a position having a portion overlapping, when viewed in the radial direction R, with at least the servo mechanism (in the present example, the piston 54, the urging member 55, and the operating oil pressure chamber H1).

Figure 6:
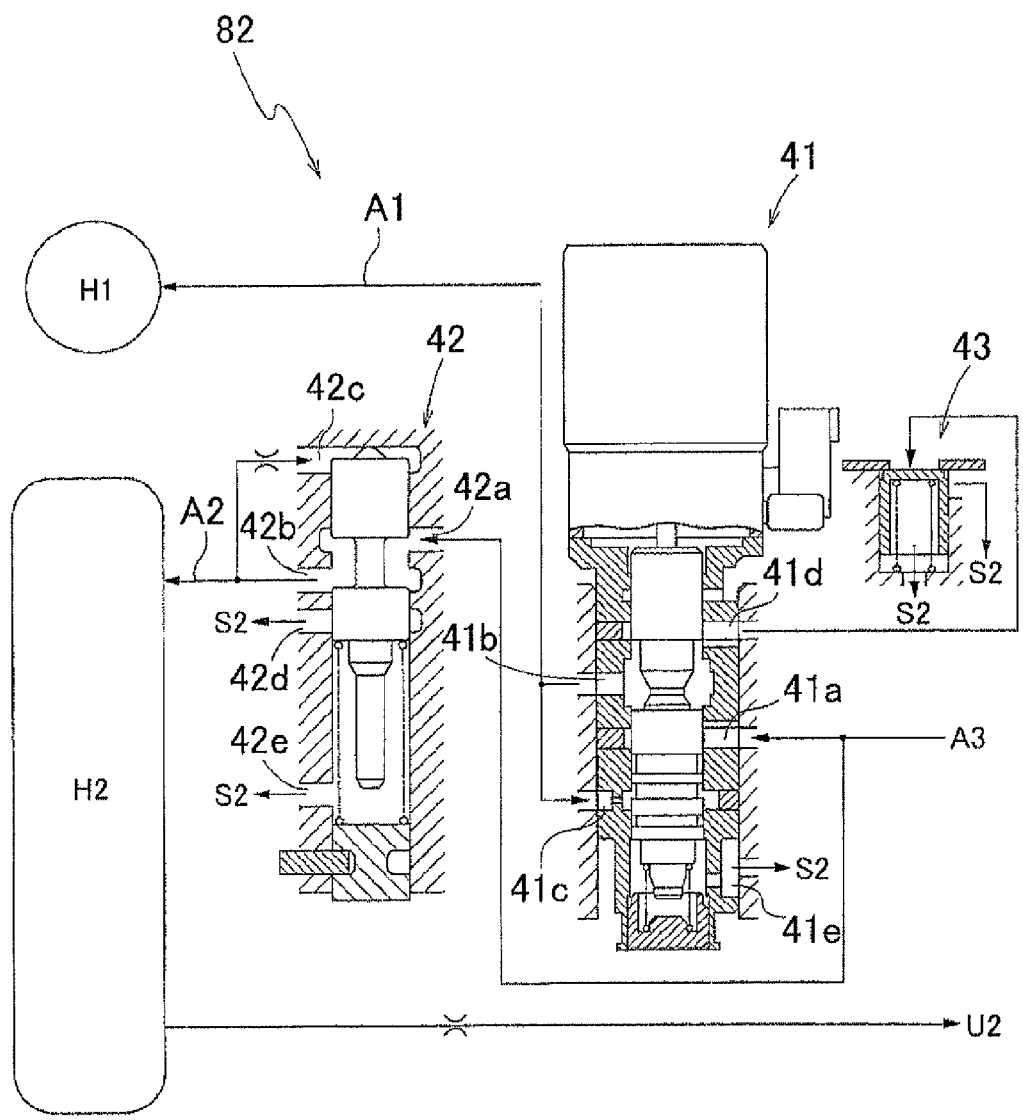
FIG. 6 is a diagram showing an outline structure of a hydraulic control system of a second hydraulic pressure control device according to the embodiment of the present invention.

The second hydraulic pressure control device 82 is provided with a plurality of hydraulic pressure control valves and a valve body 83 provided with oil passages that communicates with the hydraulic pressure control valves. In the present embodiment, as shown in FIG. 3, the oil discharged by the hydraulic pump 9 is supplied to the second hydraulic pressure control device 82 via the first hydraulic pressure control device 81 and the third oil passage A3. As described above, the third oil passage A3 is supplied with the line pressure controlled by the first hydraulic pressure control device 81, and the second hydraulic pressure control device 82 supplies the controlled hydraulic pressure to the first clutch C1. Specifically, as shown in FIG. 6, the second hydraulic pressure control device 82 is provided, as the hydraulic pressure control valves, with a first hydraulic pressure control valve 41 and a second hydraulic pressure control valve 42. The first hydraulic pressure control valve 41 is a hydraulic pressure control valve that controls the hydraulic pressure supplied to the operating oil pressure chamber H1 of the first clutch C1. The second hydraulic pressure control valve 42 is a hydraulic pressure control valve that controls (regulates) the hydraulic pressure supplied to the circulating oil pressure chamber H2 of the first clutch C1.

The first hydraulic pressure control valve 41 is, in the present embodiment, a linear solenoid valve that has an electromagnetic portion and a pressure regulating portion. Here, the electromagnetic portion is a portion serving as an actuator that controls the position of a valve element (spool). The pressure regulating portion is a portion serving as a valve. The pressure regulating portion is inserted in a valve insert hole formed in the valve body 83. The first hydraulic pressure control valve 41 is provided with an input port 41a from which the oil at the line pressure is supplied, an output port 41b from which the oil is discharged to the first oil passage A1, a feedback port 41c for generating feedback pressure, and a first discharge port 41d and a second discharge port 41e from which the oil is discharged (drained). The oil at a pressure depending on the energized state of the electromagnetic portion is supplied to the operating oil pressure chamber H1 of the first clutch C1 via the first oil passage A1. Thus, the first hydraulic pressure control valve 41 is structured so as to communicate with both of the first oil passage A1 and the third oil passage A3, and the valve body 83 is formed with a part of the first oil passage A1 and a part of the third oil passage A3.

The first discharge port 41d of the first hydraulic pressure control valve 41 has a function to appropriately discharge oil toward a third hydraulic pressure control valve 43 for adjusting the amount of oil supplied from the output port 41b to the first oil passage A1 depending on the feedback pressure. The first discharge port 41d has also a function to discharge a part of oil from the first oil passage A1 toward the third hydraulic pressure control valve 43 for causing the hydraulic pressure supplied to the operating oil pressure chamber H1 to reduce. Here, the third hydraulic pressure control valve 43 is a valve that communicates an input port with an output port of the third hydraulic pressure control valve 43 when the hydraulic pressure supplied to the input port of the third hydraulic pressure control valve 43 is a predetermined pressure or higher. That is, the third hydraulic pressure control valve 43 serves as a drain stopper of the oil in the first oil passage A1, and also serves as a check valve that restricts the oil from flowing backward from the third hydraulic pressure control valve 43 toward the first hydraulic pressure control valve 41. The oil output from the output port of the third hydraulic pressure control valve 43 is discharged into the second housing space S2. The second discharge port 41e of the first hydraulic pressure control valve 41 has a function to discharge oil in a spring chamber to the second housing space S2 when the oil in the spring chamber is at a high pressure.

The second hydraulic pressure control valve 42 is, in the present embodiment, is a type of pressure regulating valve which opens and closes both an input port 42a and a first discharge port 42d. The second hydraulic pressure control valve 42 is provided with the input port 42a from which the oil at the line pressure is supplied, an output port 42b from which the oil is discharged (drained) to the second oil passage A2, a feedback port 42c for generating feedback pressure, and the first discharge port 42d and a second discharge port 42e from which the oil is discharged (drained). After being controlled by the second hydraulic pressure control valve 42, the hydraulic pressure is supplied to the circulating oil pressure chamber H2 of the first clutch C1 via the second oil passage A2. The first discharge port 42d of the second hydraulic pressure control valve 42 has a function to appropriately discharge oil to the second housing space S2 for adjusting the amount of oil supplied from the output port 42b to the second oil passage A2 depending on the feedback pressure. The second discharge port 42e of the second hydraulic pressure control valve 42 has a function to discharge oil in a spring chamber to the second housing space S2 when the oil in the spring chamber is at a high pressure. Thus, the second hydraulic pressure control valve 42 is structured so as to communicate with the second oil passage A2, and the valve body 83 is formed with a part of the second oil passage A2.

As shown in FIG. 3, the second housing space S2 communicates with a lower portion of the first housing space S1 (rotary electric machine housing space SG) via the first communicating oil passage AC. As shown in FIG. 3, in the present embodiment, the first communicating oil passage AC is constituted by a first hole portion P1 that is formed in the first peripheral wall 34a of the first case portion 3a and that communicates an outer circumferential surface of the first peripheral wall 34a with an inner circumferential surface thereof. It should be noted that the first communicating oil passage AC (first hole portion P1) is formed at a portion having a small thickness in the radial direction R of the first peripheral wall 34a. Thereby, the length of the first communicating oil passage AC can be suppressed to be small so as to suppress the flow resistance of oil in the first communicating oil passage AC to be small. In the present example, the first communicating oil passage AC is an oil passage having almost the same size in flow passage width and flow passage length. In the present embodiment, the first communicating oil passage AC corresponds to a "communicating oil passage" in the present invention.

The second housing space S2 is formed as a space partitioned off so as to be oil-tight at portions other than the first communicating oil passage AC so that the oil can be discharged from the second housing space S2 only through the first communicating oil passage AC. The second housing space S2 is located below the first housing space S1 (rotary electric machine housing space SG), and thus, the first communicating oil passage AC is formed in an upper portion (ceiling portion) of the second housing space S2. Consequently, the second housing space S2 is basically in a state of being filled with oil, and thus, the oil discharged from an oil discharge port of the second hydraulic pressure control device 82 is discharged to the first housing space S1 located thereabove via the first communicating oil passage AC. Here, in the present embodiment, the "oil discharge port" of the second hydraulic pressure control device 82 is constituted by the first discharge port 41d and the second discharge port 41e of the first hydraulic pressure control valve 41, and by the first discharge port 42d and the second discharge port 42e of the second hydraulic pressure control valve 42.

Thereby, while the hydraulic pump 9 is rotating, the second housing space S2 is filled with oil, and the first housing space S1 (rotary electric machine housing space SG) is placed in a state in which oil is accumulated up to a lower portion thereof, as shown by an example in FIG. 3. The first housing space S1 which communicates with the second housing space S2 via the first communicating oil passage AC is placed in the state in which oil is accumulated basically only in the lower portion thereof. Therefore, even when oil at a high pressure is discharged from the oil discharge port of the second hydraulic pressure control device 82 to the second housing space S2, a change in hydraulic pressure can be absorbed by a change in oil surface level in the first housing space S1 so as to suppress the hydraulic pressure in the second housing space S2 from rising rapidly.

In the present embodiment, as shown in FIG. 4, a flow path of oil is formed such that after oil is supplied to the circulating oil pressure chamber H2 of the first clutch C1 via the second oil passage A2, the oil is supplied to the coil end portions Ce of the rotary electric machine MG via the bearing 96. Thereby, it is possible to cool the bearing 96 supporting the rotor Ro and to cool the rotary electric machine MG including the coil end portions Ce with the oil supplied to the circulating oil pressure chamber H2. Thus, the present embodiment is structured such that the oil discharged by the hydraulic pump 9 is supplied to the rotary electric machine MG.

As shown in FIG. 3, the oil supplied to the rotary electric machine MG is retained in the lower portion of the first housing space S1 (rotary electric machine housing space SG). The lower portion of the first housing space S1 communicates, via the first communicating oil passage AC, with the oil discharge port of the second hydraulic pressure control device 82 arranged in the second housing space S2. That is, in the present embodiment, a part (specifically, a part of the lower side) of the first housing space S1 (rotary electric machine housing space SG) constitutes a second oil retaining portion U2 that is provided so as to communicate with both of the oil discharge port of the second hydraulic pressure control device 82 and the first housing space S1.

As shown in FIG. 5, the oil retained in the second oil retaining portion U2 is discharged to the first oil retaining portion U1 via a discharge oil passage AD. The discharge oil passage AD is formed, in the present embodiment, so as to penetrate the joint portion 5 of the first case portion 3a and the second case portion 3b and so as to extend toward both sides in the axial direction L. The discharge oil passage AD is also formed, in the present embodiment, so as to overlap with the third oil passage A3 in a position in the up-down direction at a different horizontal location from that of the third oil passage A3. Therefore, the discharge oil passage AD is shown by dashed lines in FIGS. 2 and 3.

The discharge oil passage AD has, as shown in FIG. 5, a second opening AEo that opens to the first housing space S1 having the second oil retaining portion U2 and a first opening ADo that opens to the first hydraulic pressure control device housing space having the first oil retaining portion U1. Specifically, the discharge oil passage AD is provided with a main body oil passage that extends in the horizontal direction (specifically, in the axial direction L) and a second communicating oil passage AE that extends in a direction inclined (in the present example, inclined by approximately 45 degrees) relative to the horizontal direction. The main body oil passage is formed so as to be provided with the first opening ADo at an end on the second axial direction L2 side, and so as to communicate with the second communicating oil passage AE at a portion on the first axial direction L1 side relative to the joint portion 5. Specifically, the main body oil passage is structured by connecting, in the axial direction L, a third hole portion P3 that is formed in the first peripheral wall 34a and extends in the axial direction L with a fourth hole portion P4 that is formed in the second peripheral wall 34b and extends in the axial direction L.

The second communicating oil passage AE is formed so as to be provided, at an upper end thereof, with the second opening AEo, and so as to be opened, at a lower end thereof, to an upper surface portion (ceiling portion) of the main body oil passage. Specifically, the second communicating oil passage AE is formed by a second hole portion P2 through which the inner circumferential surface of the first peripheral wall 34a communicates with the upper surface portion of the third hole portion P3 constituting the main body oil passage. A seal member is provided around the penetrating portion (connecting portion of the third hole portion P3 and the fourth hole portion P4 in the joint portion 5) of the joint portion 5 in the discharge oil passage AD, and thus, the oil in the discharge oil passage AD is suppressed from leaking out of the case 3 via the joint portion 5. As shown in FIG. 3, a seal member is also provided around a penetrating portion of the joint portion 5 in the third oil passage A3, and thus, the oil in the third oil passage A3 is suppressed from leaking out of the case 3 via the joint portion 5.

As shown in FIG. 5, the second opening AEo is located above the first opening ADo. In other words, an upper end portion of the second communicating oil passage AE is located above a lower end portion B of the first opening ADo. In addition, while the hydraulic pump 9 is rotating, the oil level in the first oil retaining portion U1 is basically located below the lower end portion B of the first opening ADo. Thereby, the simple structure using gravity can efficiently return the oil in the second oil retaining portion U2 to the first oil retaining portion U1 connected to a suction oil passage (not shown) of the hydraulic pump 9, without providing a dedicated pump or the like in the discharge oil passage AD. Although the oil level in the first oil retaining portion U1 depends on, for example, the amount and characteristics (such as viscosity) of oil circulated in the case 3 and the rotational speed of the pump drive shaft 67, the lower end portion B of the first opening ADo is preferably structured to be located above the highest oil level in the first oil retaining portion U1 while the hydraulic pump 9 is rotating.

As described above, the second opening AEo is located above the first opening ADo. Moreover, in the present embodiment, the cross-sectional area of the second communicating oil passage AE is set so that the allowable flow rate of oil in the second communicating oil passage AE is greater than the supply rate of oil to the second oil retaining portion U2. In addition, as described above, the oil supplied to the rotary electric machine MG and the oil discharged from the oil discharge port of the second hydraulic pressure control device 82 are supplied to the second oil retaining portion U2. Thereby, the oil level in the second oil retaining portion U2 is basically determined by the height (position in the up-down direction) of the upper end portion of the second communicating oil passage AE (that is, the second opening AEo), and specifically, determined to be at almost the same height as that of the upper end portion of the second communicating oil passage AE. Furthermore, in the present embodiment, as shown in FIG. 5, the second communicating oil passage AE is formed so that the second opening AEo is located below the lowermost portion of the inner circumferential surface of the stator St (specifically, a stator core). Thereby, even while the hydraulic pump 9 is rotating, the oil level in the second oil retaining portion U2 can be suppressed from being located higher than the lowermost portion of the inner circumferential surface of the stator St, thus making it possible to reduce a rotational resistance of the rotor Ro.

In the present embodiment, the oil suctioned from the first oil retaining portion U1 and discharged by the hydraulic pump 9 is supplied to both of the first hydraulic pressure control device 81 and the second hydraulic pressure control device 82. In addition, as described above, the oil cooler is provided in the circulation path of the oil flowing through the hydraulic pump 9, the first hydraulic pressure control device 81, the torque converter TC, and the speed change mechanism TM. Therefore, the temperature of the oil retained in the first oil retaining portion U1 is maintained at a predetermined temperature or lower. This makes it easy to supply the oil to the rotary electric machine MG at an oil temperature capable of cooling the rotary electric machine MG without providing an oil cooler in the flow path of oil between the second hydraulic pressure control device 82 and the rotary electric machine MG.

4. Other Embodiments

Finally, other embodiments of the vehicle drive device according to the present invention will be described. Note that each structure to be disclosed in each embodiment below can be applied in combination with any structure disclosed in another embodiment, unless any contradiction occurs.

(1) In the above embodiment, the description has been made by taking an example of the structure in which the oil discharged by the hydraulic pump 9 is supplied to the second hydraulic pressure control device 82 via the first hydraulic pressure control device 81 the third oil passage A3. However, embodiments of the present invention are not limited to this example, but the vehicle drive device can also be structured such that the second hydraulic pressure control device 82 is provided with the line pressure control valve, and the oil discharged by the hydraulic pump 9 is directly supplied to the second hydraulic pressure control device 82, not passing through the first hydraulic pressure control device 81.

(2) In the above embodiment, the description has been made by taking an example of the structure in which the oil discharged from the oil discharge port of the second hydraulic pressure control device 82 is discharged to the second oil retaining portion U2, and then discharged to the first oil retaining portion U1 via the discharge oil passage AD through which the first housing space S1 communicates with the first oil retaining portion U1. However, embodiments of the present invention are not limited to this example, but the vehicle drive device can also be structured such that the oil discharged from the oil discharge port of the second hydraulic pressure control device 82 is discharged to the first oil retaining portion U1 via a separate oil passage other than the discharge oil passage AD. For example, such a structure may be employed if the second hydraulic pressure control device 82 is arranged above the lower end portion of the first hydraulic pressure control device 81. In this case, the structure can be made such that the oil is passed through the separate oil passage by using, for example, the discharge pressure of the second hydraulic pressure control device 82 in addition to the gravity acting on the oil.

(3) In the above embodiment, the description has been made by taking an example of the structure in which the second hydraulic pressure control device 82 is fixed to the lower portion of the case 3 (in the present example, the first case portion 3a). However, embodiments of the present invention are not limited to this example, but the vehicle drive device can also be structured such that the second hydraulic pressure control device 82 is fixed to, for example, a side face portion of the peripheral wall 34 (a portion having a surface facing a horizontal direction on the outer circumferential portion of the peripheral wall 34) of the case 3. In this case, the structure can be made such that the second housing space S2 is formed by the first case portion 3a and a side cover covering the side face portion of the case 3 to which the second hydraulic pressure control device 82 is fixed, instead of being formed by the first case portion 3a and the second oil pan 12. In such a case, the structure is preferably such that at least a part of the electromagnetic portion of the first hydraulic pressure control valve 41 is located below the oil level, and that the oil discharge port of the second hydraulic pressure control device 82 (specifically, a portion where the oil discharge port opens to the outside of the second hydraulic pressure control device 82) is located above the oil level. With such a structure, the electromagnetic portion can be cooled, and the discharge resistance of oil at the oil discharge port can be suppressed to be small. The structure can also be made such that the second hydraulic pressure control device 82 is fixed to an upper portion of the peripheral wall 34 (a portion having an upward facing surface on the outer circumferential portion of the peripheral wall 34) of the case 3.

(4) In the above embodiment, the description has been made by taking an example of the structure in which the second hydraulic pressure control device 82 is arranged in a position having a portion overlapping with the rotary electric machine MG when viewed in the radial direction of the rotary electric machine MG. However, embodiments of the present invention are not limited to this example, but the vehicle drive device can also be structured such that the second hydraulic pressure control device 82 is arranged in a position different from that of the rotary electric machine MG in the axial direction of the rotary electric machine MG, so as not to have a portion overlapping with the rotary electric machine MG when viewed in the radial direction of the rotary electric machine MG.

(5) In the above embodiment, the description has been made by taking an example of the structure in which the second hydraulic pressure control device 82 is arranged in a position having a portion overlapping with the first clutch C1 when viewed in the radial direction of the first clutch C1. However, embodiments of the present invention are not limited to this example, but the vehicle drive device can also be structured such that the second hydraulic pressure control device 82 is arranged in a position different from that of the first clutch C1 in the axial direction of the first clutch C1, so as not to have a portion overlapping with the first clutch C1 when viewed in the radial direction of the first clutch C1.

(6) In the above embodiment, the description has been made by taking an example of the case in which a part (specifically, a part of the lower side) of the first housing space S1 constitutes the second oil retaining portion U2 that is provided so as to communicate with both of the oil discharge port of the second hydraulic pressure control device 82 and the first housing space S1 (rotary electric machine housing space SG). However, embodiments of the present invention are not limited to this example, but the vehicle drive device can also be structured such that the second oil retaining portion U2 is formed in a space formed below the first housing space S1 and on the radially outward direction R2 side relative to the first peripheral wall 34a.

(7) In the above embodiment, the description has been made by taking an example of the structure in which the case 3 is formed such that the case 3 is separable into the first case portion 3a forming the first housing space S1 (rotary electric machine housing space SG) and the second case portion 3b forming the speed change mechanism housing space SM. However, embodiments of the present invention are not limited to this example, but it is possible to appropriately change a part at which the case 3 is separable.

(8) In the above embodiment, the description has been made by taking an example of the structure in which the rotary electric machine MG, the torque converter TC, and the speed change mechanism TM are arranged in this order in the second axial direction L2 from the first axial direction L1 side. However, embodiments of the present invention are not limited to this example, but the vehicle drive device can also be structured such that the torque converter TC, the rotary electric machine MG, and the speed change mechanism TM are arranged in this order in the second axial direction L2 from the first axial direction L1 side. In the above embodiment, the description has been made by taking an example of the structure in which all of the rotary electric machine MG, the torque converter TC, and the first clutch C1 are arranged on the first axial direction L1 side relative to the speed change mechanism TM. However, the structure can also be made such that at least any one of the rotary electric machine MG, the torque converter TC, and the first clutch C1 is arranged on the second axial direction L2 side relative to the speed change mechanism TM.

(9) In the above embodiment, the description has been made by taking an example of the structure in which the oil supplied from the second hydraulic pressure control device 82 to the circulating oil pressure chamber H2 of the first clutch C1 is discharged from the circulating oil pressure chamber H2, and then, supplied to rotary electric machine MG. However, embodiments of the present invention are not limited to this example, but the vehicle drive device can also be structured such that the oil discharged from the circulating oil pressure chamber H2 is not supplied to the rotary electric machine MG, but directly returned to the first oil retaining portion U1 via an oil passage.

(10) In the above embodiment, the description has been made by taking as an example the structure in which the second hydraulic pressure control device 82 is provided with the second hydraulic pressure control valve 42, and the hydraulic pressure controlled by the second hydraulic pressure control valve 42 is supplied to the circulating oil pressure chamber H2 of the first clutch C1. However, embodiments of the present invention are not limited to this example, but the vehicle drive device can also be structured such that the hydraulic pressure controlled by the second hydraulic pressure control device 82 is supplied only to the operating oil pressure chamber H1 of the first clutch C1.

(11) In the above embodiment, the description has been made by taking an example of the structure in which the rotary electric machine housing space SG, the fluid coupling housing space SC, and the speed change mechanism housing space SM are formed as spaces independent from one another. However, embodiments of the present invention are not limited to this example, but the vehicle drive device can also be structured such that the rotary electric machine housing space SG and the fluid coupling housing space SC are formed in an integrated manner if oil flows in a limited flow path in the rotary electric machine housing space SG. In the above embodiment, the description has been made by taking an example of the structure in which the rotary electric machine MG is housed in the first housing space S1. However, the structure can also be made such that the rotary electric machine MG is housed in a space formed in a position different from that of the first housing space S1 in the axial direction L, that is, such that the rotary electric machine housing space SG is formed as a space independent from the first housing space S1 in a position different from that of the first housing space S1 in the axial direction L.

(12) In the above embodiment, the description has been made by taking an example of the structure in which the vehicle drive device 1 has a single-axis structure, and all of the input shaft I, the first clutch C1, the rotary electric machine MG, the torque converter TC, the intermediate shaft M, the speed change mechanism TM, and the output shaft O are arranged on the same axis. However, embodiments of the present invention are not limited to this example, but the vehicle drive device 1 can also be structured as a drive device having a multi-axis structure by arranging at least any one of the input shaft I, the first clutch C1, the rotary electric machine MG, the torque converter TC, the intermediate shaft M, and the output shaft O on an axis different from that of the speed change mechanism TM. Such a drive device having a multi-axis structure is preferable if the vehicle drive device 1 is further provided with a counter gear mechanism. Such a structure provided with a counter gear mechanism is suitable when mounted on a vehicle of an FF (front engine, front drive) type.

(13) In the above embodiment, the description has been made by taking an example of the structure in which the hydraulic pressure controlled by the first hydraulic pressure control valve 41 of the second hydraulic pressure control device 82 is directly supplied to the operating oil pressure chamber H1 of the first clutch C1. However, embodiments of the present invention are not limited to this example, but the vehicle drive device can also be structured such that a separate hydraulic pressure control valve (not shown) other than the first hydraulic pressure control valve 41 is provided, and the hydraulic pressure controlled (regulated) by the separate hydraulic pressure control valve is supplied to the operating oil pressure chamber H1 of the first clutch C1. In this case, the structure is preferably such that the separate hydraulic pressure control valve operates using as signal pressure the hydraulic pressure controlled by the first hydraulic pressure control valve 41 so as to serve as a pressure regulating valve that regulates the line pressure, and the separate hydraulic pressure control valve is provided in the second hydraulic pressure control device 82.

(14) In the above embodiment, the description has been made by taking an example of the structure in which the first hydraulic pressure control device housing space that houses the first hydraulic pressure control device 81 is formed as a space surrounded by the second case portion 3b and the first oil pan 11 mounted to the lower portion of the second case portion 3b. However, embodiments of the present invention are not limited to this example, but the first hydraulic pressure control device housing space can also be structured to be formed by only a portion of the case 3 formed integrally with the second case portion 3b (for example, structured to be formed inside the peripheral wall of the second case portion 3b).

(15) In the above embodiment, the description has been made by taking an example of the structure in which the second housing space S2 that houses the second hydraulic pressure control device 82 is formed as a space surrounded by the first case portion 3a and the second oil pan 12 mounted to the lower portion of the first case portion 3a. However, embodiments of the present invention are not limited to this example, but the second housing space S2 can also be structured to be formed by only a portion of the case 3 formed integrally with the first case portion 3a (for example, structured to be formed inside the peripheral wall of the first case portion 3a).

(16) In the above embodiment, the description has been made by taking an example of the structure in which the vehicle drive device 1 is provided, as a fluid coupling, with the torque converter TC having a torque amplifying function. However, embodiments of the present invention are not limited to this example, but the vehicle drive device 1 can also be structured to be provided with a fluid coupling having no torque amplifying function instead of the torque converter TC, or the vehicle drive device 1 can be structured to be provided with no fluid coupling.

(17) Regarding also other structures, the embodiments disclosed in the present specification are examples in all respects, and embodiments of the present invention are not limited to these examples. That is, any structure not described in the claims of the present application can be changed as appropriate within the scope not departing from the purpose of the present invention.

The present invention can preferably be used for a vehicle drive device provided with an input member drivingly connected to an internal combustion engine, a rotary electric machine, a speed change mechanism drivingly connected to the rotary electric machine, an output member drivingly connected to the speed change mechanism and wheels, and an engagement device that is capable of changing the state of engagement between the input member and the speed change mechanism.

What is claimed is:
1. A vehicle drive device comprising:
an input member drivingly connected to an internal combustion engine;
a rotary electric machine;
a speed change mechanism drivingly connected to the rotary electric machine;
an output member drivingly connected to the speed change mechanism and wheels;
an engagement device configured to change a state of engagement between the input member and the speed change mechanism;
a hydraulic pump configured to discharge oil when driven by the internal combustion engine or the rotary electric machine;
a first hydraulic pressure control device that controls hydraulic pressure supplied from the hydraulic pump and supplies the controlled hydraulic pressure to the speed change mechanism;
a second hydraulic pressure control device that is provided separately from the first hydraulic pressure control device, and that supplies the hydraulic pressure to the engagement device;
a first case that houses the rotary electric machine and the engagement device; and
a second case that houses the speed change mechanism and the hydraulic pump;
wherein
a first oil retaining portion that is capable of retaining oil is provided below the second case, and a second housing space that is capable of retaining oil is provided below the first case; and
the first hydraulic pressure control device is housed in the first oil retaining portion, and the second hydraulic pressure control device is housed in the second housing space.

2. The vehicle drive device of claim 1, wherein the first case portion is formed with a support wall portion that is formed so as to extend in a radial direction of the rotary electric machine, and a peripheral wall portion formed so as to extend around an outer periphery of the vehicle drive device,
the second hydraulic pressure control device communicates with the engagement device by a communicating oil passage formed in the support wall portion.

3. The vehicle drive device of claim 1, wherein the first retaining portion and the second housing space share an oil passage for communicating with each other.

* * * * *